US009911362B2

(12) United States Patent
Acuna

(10) Patent No.: US 9,911,362 B2
(45) Date of Patent: Mar. 6, 2018

(54) METHOD OF DEMONSTRATING THE CLEANING PERFORMANCE OF A CLEANING COMPOSITION

(71) Applicant: The Procter & Gamble Company, Cincinnati, OH (US)

(72) Inventor: Alyssa Grace Acuna, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 275 days.

(21) Appl. No.: 14/755,393

(22) Filed: Jun. 30, 2015

(65) Prior Publication Data
US 2017/0004727 A1    Jan. 5, 2017

(51) Int. Cl.
G09B 25/00 (2006.01)
G09B 23/24 (2006.01)
C11D 11/00 (2006.01)

(52) U.S. Cl.
CPC .......... *G09B 23/24* (2013.01); *C11D 11/0023* (2013.01)

(58) Field of Classification Search
USPC ....... 434/276, 283, 298, 365, 366, 367, 377, 434/382
See application file for complete search history.

(56) References Cited

U.S. PATENT DOCUMENTS

| | | | |
|---|---|---|---|
| 4,772,207 A * | 9/1988 | Lafontsee | G09B 25/02 206/579 |
| 5,137,460 A * | 8/1992 | Middleton | G09B 25/00 206/579 |
| 5,362,322 A | 11/1994 | Johansen, Jr. et al. | |
| 6,281,181 B1 | 8/2001 | Vinson et al. | |
| 7,780,453 B2 * | 8/2010 | Carling | A61L 2/18 250/459.1 |
| 8,192,205 B2 * | 6/2012 | Weaver | G09B 19/0076 434/367 |
| 2002/0168622 A1 * | 11/2002 | Cates | G09B 25/00 434/365 |
| 2006/0105936 A1 | 5/2006 | Shi et al. | |
| 2008/0244845 A1 * | 10/2008 | Goibier | C11D 3/40 15/104.93 |
| 2012/0325710 A1 * | 12/2012 | Woulms | G09B 25/00 206/459.5 |
| 2014/0206591 A1 | 7/2014 | Keuleers et al. | |
| 2014/0377194 A1 * | 12/2014 | Strand | A61K 8/24 424/57 |

OTHER PUBLICATIONS

Velasquez, Gary—"Milk-Fat Surface Tension and Surfactant Interactions" MCEN 5228—Flow Visualization, University of Colorado at Boulder—Mar. 14, 2011, 7 pages.

* cited by examiner

*Primary Examiner* — Kurt Fernstrom

(74) *Attorney, Agent, or Firm* — Lauren Christine Gonzalez; Amy I. Ahn-Roll

(57) ABSTRACT

A method of demonstrating the cleaning performance of a cleaning composition comprises the steps of: providing a homogenous dairy-based solution on a demonstration surface; distributing oil composition on the homogenous dairy based solution to produce an oil dispersion on the demonstration surface; adding a cleaning composition onto the oil dispersion to view the displacement of the oil composition.

17 Claims, 3 Drawing Sheets

METHOD OF DEMONSTRATING THE CLEANING PERFORMANCE OF A CLEANING COMPOSITION

TECHNICAL FIELD

The present invention relates to methods of demonstrating the cleaning performance of a cleaning composition and oil dispersions for use in such demonstrations.

BACKGROUND OF THE INVENTION

The marketing and sales promotion of cleaning products, such as dish detergents, can benefit greatly by conducting demonstrations, either live or via broadcast media, that provide reliable and repeatable results to show the cleaning performance of the product. Demonstration methods that effectively present the benefits of a cleaning product to the consumer typically result in a greater chance that a consumer will try the product.

Some demonstration methods have utilized grease and water. For example, test methods have utilized liquefied grease that is placed into a shallow dish having tap water. While this method involving grease and water is representative of the types of grease found on soiled dishware, it tends to be highly variable in composition. Such grease and water methods are, therefore, undesirable to use in demonstrations to consumers to show the cleaning performance of a cleaning product as reliability and repeatability are important.

There continues to be a need to provide methods for demonstrating the cleaning performance of a cleaning product that are easily repeatable and that provide reliable results.

SUMMARY OF THE INVENTION

The present invention relates to a method of demonstrating the cleaning performance of a cleaning composition, said method comprising the steps of: (a) providing (a) providing a homogenous dairy-based solution on a demonstration surface; (b) distributing an oil composition on said surface, wherein the ratio of said oil composition to said homogenous dairy-based solution is about 1:2.2 to less than about 1:44; (c) waiting from about 1 minute to about 15 minutes for said oil composition to disperse to form a visibly even oil dispersion on said demonstration surface; and (d) adding an effective amount of a cleaning composition on said oil dispersion.

The present invention also relates to a method of demonstrating the grease cleaning performance of a cleaning composition, said method comprising the steps of: (a) providing a homogenous dairy-based solution having a temperature of about 5° C. to about 50° C. on a demonstration surface; (b) distributing an oil composition on said surface, wherein the ratio of oil to homogenous dairy-based solution is about 1:2.2 to less than about 1:44; (c) waiting from about 1 minute to less than 15 minutes for said oil composition to disperse to form a visibly even oil dispersion on said demonstration surface; (d) adding an effective amount of said cleaning composition on said oil dispersion.

The present invention also relates to a method of demonstrating the grease cleaning performance of a dish detergent, said method comprising the steps of: (a) providing a homogenous dairy-based solution having a temperature of about 25° C. to about 30° C. on a demonstration surface; (b) distributing an oil composition on said surface, wherein the ratio of oil to homogenous dairy-based solution is about 1:2.2 to less than about 1:5; (c) waiting from about 1 minute to about 3 minutes for said oil composition to disperse to form a visibly even oil dispersion on said demonstration surface; (d) diluting a dish detergent with an aqueous carrier and forming a suds dispersion; and (e) adding an effective amount of said suds dispersion on said oil dispersion.

BRIEF DESCRIPTION OF THE DRAWINGS

Further features of the invention are set forth in the following detailed description of the preferred embodiment of the invention and in the drawing figures.

DETAILED DESCRIPTION OF THE INVENTION

Figure 1:
FIG. 1 is a photo exemplifying the cleaning product being added to an oil dispersion of the present invention.

The present invention relates to methods of demonstrating the cleaning performance of a cleaning composition. The present methods are important to show consumers the effectiveness of a cleaning composition, for example, in removing grease from soiled dishware. An important aspect of the present method is the ability to demonstrate the cleaning performance of a cleaning composition on a consistent basis such as when practicing the method repeatedly over relatively short time periods. Such demonstrations can be conducted in retail stores, in television commercials, in video streaming via the internet, as well as other broadcast media and other live venues. The demonstration methods herein are relatively easy to perform and do not require a long period of time to set-up and complete the demonstration method. The oil dispersions of the present invention are an important aspect of the present methods in order to achieve these benefits from the methods.

The methods of demonstrating the cleaning performance of a cleaning composition generally comprise the steps of:

(a) providing a homogenous dairy-based solution on a demonstration surface;

(b) distributing oil composition on the homogenous dairy-based solution to produce an oil dispersion on the demonstration surface;

(c) adding a cleaning composition onto the oil dispersion to view the displacement of the oil composition.

Demonstration surfaces suitable for use in the present methods include, but are not limited to dishware such as plates, trays, casserole dishes, bowls; shallow reservoirs; and the like. The demonstration surface may be made of melamine, plastic, glass, metal, ceramic, vinyl, wood, coated concrete, and other materials that can retain the homogenous dairy-based solution and oil for at least the duration of the method. The demonstration surface may cover a relatively small area, for example, an area of about 10 inches to about 20 inches in diameter.

The oil dispersion is made from a homogenous dairy-based solution and an oil composition. The homogenous dairy-based solution may be a solution containing mammalian milk fat, such as cow's milk (e.g. half and half, whole, 1% milk, skim) goat milk, buttermilk, etc.; whipping cream; and mixtures thereof. The homogenous dairy-based solution may have a temperature of typical room temperatures, or a temperature of from about 22° C. to about 27° C. The homogenous dairy-based solution may have a temperature from about 5° C. to about 50° C. or about 15° C. to about 30° C., or about 25° C. to about 30° C.

The oil composition of the present invention may include cooking oils such as sesame oil, canola oil, olive oil, grapeseed oil, coconut oil, corn oil, peanut oil, and mixtures thereof. The oil composition may be distributed across the demonstration surface at a level of less than about 6 ml per square inch, or from about 1 ml per square inch to about 6 ml per square inch, or from about 1 ml per square inch to about 3 ml per square inch. If appropriate, the oil composition can be dispersed onto the demonstration surface by pouring about 5 ml to about 100 ml, or about 10 mol to about 90 ml, or about 10 ml to about 80 ml, or about 20 ml to about 60 ml of oil from a bottle or using a large pipette and then distributing the oil to the surface by releasing the oil from the pipette.

The ratio of oil to homogenous dairy-based solution in the oil dispersion may be about 1:2.2 to less than about 1:44; or from about 1:2.2 to less than 1:44, or from about 1:5 to about 1:8, or from about 1:5 to about 1:7.3, or about 1:7.3.

Once the oil dispersion has been formed on the demonstration surface, the cleaning composition can be distributed across the oil dispersion to absorb/remove the oil composition from the oil dispersion. The cleaning composition may be added to the oil dispersion after a wait time of less than 15 minutes, or from about 1 minute to less than about 15 minutes, or from about 1 minute to about 3 minutes. After the cleaning composition is added to the oil dispersion, the demonstration surface can be shown to the consumer to whom the demonstration is directed to show that the oil composition has been absorbed/removed from the oil dispersion.

Any known cleaning products can be used. Some cleaning compositions having surfactant systems are described in detail in U.S. Pat. No. 6,281,181; and U.S. Patent Publication Nos. 2014/0206591 and 2006/0105936. The present cleaning composition may be made in to a diluted cleaning solution by combining the cleaning composition with an aqueous carrier. The aqueous carrier may be tap water, deionized water, filtered water, and the like. The cleaning composition may be present in an amount from about 0.1% to about 10%, by weight of said diluted cleaning solution, or from about 2 wt. % to about 8 wt. %, or from about 4 wt. % to about 6 wt. %.

The present oil dispersion may comprise a colorant to enhance the ability of the consumer to observe the oil that has been absorbed/removed from the surface. Colorants are optionally incorporated in the present oil dispersion to provide an enhanced color to the dispersion. Colorants can be important to better display the removal of the oil composition from the demonstration surface. The colorants that are incorporated into oil dispersions of the present invention are preferably dry or powder colorants such as graphitic carbons (e.g. activated carbon, carbon black, carbon lampblack, activated charcoal, coke, and the like), iron oxide, natural burnt umber, chromium oxide, ultra marine blue, titanium dioxide, and the like, and are commercially available from Harcross Pigments, Inc., Bayer Corporation, Reckitts Colour Ltd., Mallinckrodt Baker Inc., and DuPont Corp. Liquid colorants can also be used in the present invention. If a liquid colorant is used it should be capable of being dispersed in aqueous carrier. Other colorants are described in U.S. Pat. No. 5,362,322 and are incorporated herein by reference. An exemplary colorant is a graphitic carbon, such as activated carbon. A suitable activated carbon colorant is commercially available from Mallinckrodt Baker, Inc. (Phillipsburg, N.J. USA). The present oil dispersions may comprise a colorant at a level of from about 0.01% to about 99%, or from about 0.01% to about 10%, or from about 0.1% to about 1%, by weight of the oil dispersion.

The present invention further encompasses a demonstration kit for demonstrating the cleaning performance of a cleaning composition, said kit comprising: (a) a homogenous dairy-based solution; (b) an oil composition, as described herein (preferably contained in a plastic jar); (c) at least one cleaning composition to be demonstrated, as described herein; (d) optionally, a demonstration surface, as described herein; (e) optionally, a measuring device such as a large pipette, spoon, and/or ladle; (e) optionally, a spatula or similar implement; (f) optionally, a cleaning implement such as a sponge; (g) optionally, a timer. The kit may further comprises a set of instructions comprising instructions to demonstrate the cleaning performance of the cleaning composition by carrying out the steps of the methods described herein.

Visible Oil Removal Test Method

This example represents the effectiveness of the cleaning composition in visibly removing oil from a homogenous dairy-based solution.

Materials:
1 bottle Dawn Blue dish detergent
1 bottle Palmolive 1× dish detergent
1 melamine plate—10" in diameter
2 cellulose sponges
1 100 ml graduated cylinder
2 5 ml syringes
1 gallon Kroger™ brand whole milk (room temperature)
1 bottle Dynasty™ Sesame Oil (or other brand of oil)
2 600 ml beakers
2 small plastic cups (for product)
2 spoons
Tap Water Procedure:
1. Pour 300 ml of an aqueous carrier (e.g. tap water, filtered water, deionized water, etc.) into each of the two 600 ml beakers and set aside. Pour dish detergent products into separate small 2 to 4 oz. plastic cups.

2. Pour 140 ml of room temperature milk onto the face of the melamine plate. Add 50 ml of sesame oil and let stand for 1 minute. A uniform layer of oil forms at the surface.

3. In one 5 ml syringe, draw up Dawn dish detergent and dispense product onto one sponge. In the second 5 ml syringe, draw up Palmolive 1× dish detergent and dispense product onto the second sponge.

4. Place sponges in separate beakers and squeeze 10 times to generate suds.

5. Wipe suds off hands and pick up a spoon in each hand. Scoop a spoonful of suds from each beaker.

6. As seen in FIG. 1, place suds on opposing ends oil dispersion on plate.

Figure 2:
FIG. 2 is a photo showing the cleaning performance of cleaning compositions after the adding step.

As seen in FIG. 2, the surfactant system of each dish detergent chemically binds to the oil and displaces the oil composition, showing the cleaning performance of the dish detergent.

Control Tests

The following examples represent the effectiveness of a cleaning composition in visibly displacing oil from a homogenous dairy-based solution when altering temperature of milk, wait time of oil on milk, or ratio of milk to oil.

Figure 3:
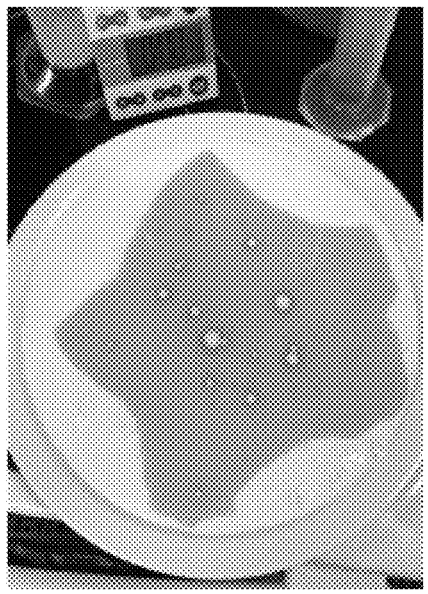
FIG. 3 is a photo of the oil dispersion where the oil composition is less than fully dispersed and does not form a uniform layer on a milk surface.

Materials:
1 bottle Dawn™ Blue dish detergent
1 bottle Palmolive™ 1× dish detergent
1 melamine plate (10" in diameter)
2 cellulose sponges
1 100 ml graduated cylinder
2 5 ml syringes
1 gallon Kroger™ brand whole cow's milk (at room temperature) House of Tsang™ Pure Sesame Seed Oil Control Test 1: Oil Dispersion With Cold Milk Pour 220 ml of whole milk, which has a temperature reading of 4.9° C., onto the face of a melamine plate. Add 30 ml of room temperature sesame oil and let stand for 1 minute. As can be seen in FIG. 3, the dispersion of oil on the milk is slowed and a uniform layer of oil does not form at the milk surface. It is believed the dispersion of oil on milk is slowed due to increased viscosity.

Control Test 2: Oil Dispersion Under Longer Dispersion Times

Figure 4:
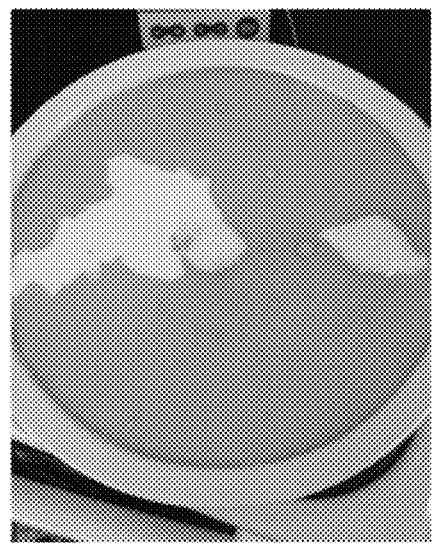
FIG. 4 is a photo showing the performance of a cleaning composition in displacing oil when the cleaning composition is added to the oil dispersion at 15 minutes wait time.
Figure 5:
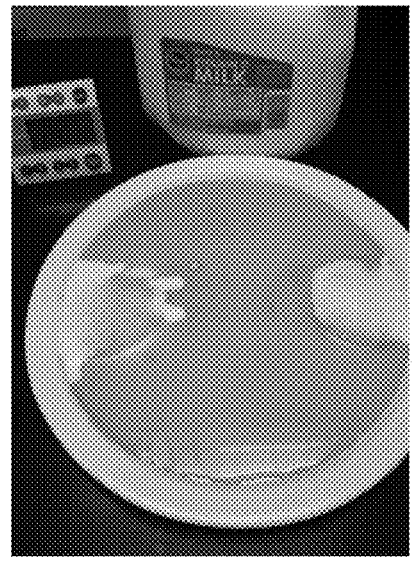
FIG. 5 is a photo showing the performance of a cleaning composition in displacing oil when the cleaning composition is added to the oil dispersion at 20 minutes wait time.

Control Test 1 (above) is performed with the whole milk measuring at a temperature of 5.2° C. In this test, the sesame oil is allowed to disperse on the milk for 15 minutes. The visible effectiveness of the cleaning composition in displacing oil is not well observed as shown in FIG. 4. It is believe this is due to increased viscosity. This test is repeated, allowing the oil to disperse on the milk for 20 minutes. The results are shown in FIG. 5.

Complete dispersion of oil on surface of milk occurs as fast as 20 seconds and as slow as 7 minutes depending on milk temperature. After 15 minutes of wait time, it is believed the oil begins to interact with milk fats and proteins. The complex mixture does not give a clean oil dispersion.

Control Test 3: Oil dispersion With Milk:Oil ratio of 2.2:1

Control Test 1 (above) is repeated with the whole milk measuring at a temperature of 5.2° C. In this test, a larger volume—100 ml—of room temperature sesame oil added to the plate.

Figure 6:
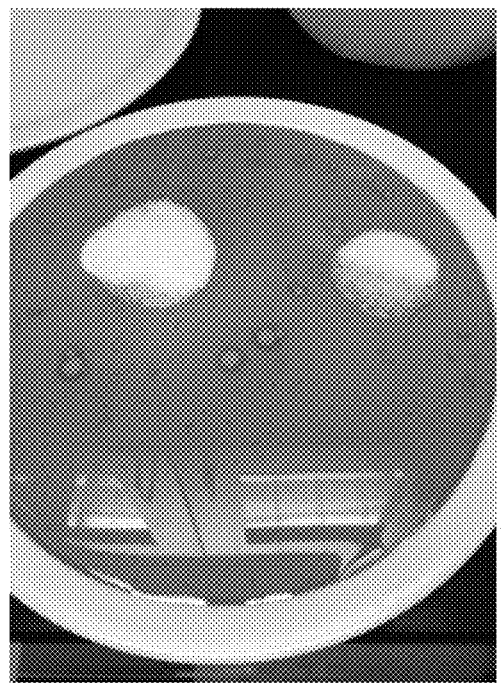
FIG. 6 is a photo showing the cleaning performance differentiation between two cleaning compositions where the ratio of milk to oil is 2.2:1.

As shown in FIG. 6, product differentiation in cleaning performance is not demonstrated at this milk:oil ratio of 2.2:1. The amount of oil is too heavy for the surfactants in the dish detergent to displace the oil.

Control Test 4: Oil Dispersion With Milk:Oil Ratio of 44:1

Figure 7:
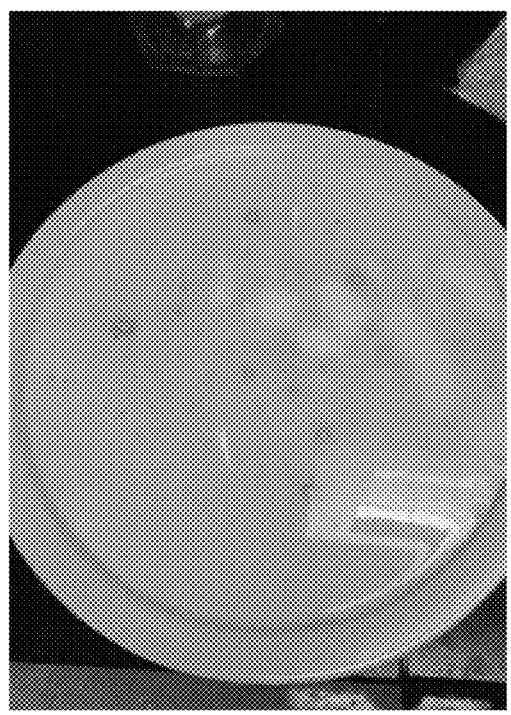
FIG. 7 is a photo showing that cleaning performance is not visible where the milk to oil ratio is 44:1.

Control Test 1 (above) is again repeated with 220 ml of cold milk at 5.3° C. In this test, 5 ml of room temperature sesame oil is added to the plate. As shown in FIG. 7, product differentiation in cleaning performance is not demonstrated at this milk:oil ratio of 44:1. There is an insufficient volume of oil to evenly disperse on surface of 220 ml of milk.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm"

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of demonstrating the grease cleaning performance of a cleaning composition, said method comprising the steps of:
   (a) providing a homogenous dairy-based solution on a demonstration surface;
   (b) distributing an oil composition on said surface, wherein the ratio of said oil composition to said homogenous dairy-based solution is 1:2.2 to less than 1:44;
   (c) waiting from about 1 minute to less than about 15 minutes for said oil composition to disperse to form a visibly even oil dispersion on said demonstration surface; and
   (d) adding a cleaning composition on said oil dispersion.

2. The method of claim 1 wherein said homogenous dairy-based solution has a temperature of 5° C. to 50° C.

3. The method of claim 1 wherein said waiting step comprises waiting for about 1 minute to about 3 minutes.

4. The method of claim 1 wherein said homogenous dairy-based solution is whole cow's milk having a temperature of 15° C. to 30° C.

5. The method of claim 1 wherein said homogenous dairy-based solution is whole cow's milk having a temperature of 22° C. to 27° C.

6. The method of claim 1 wherein said ratio of oil to homogenous dairy-based solution is 1:2.2 to 1:8.

7. The method of claim 1 wherein said ratio of oil to homogenous dairy-based solution is 1:5 to 1:8.

8. The method of claim 1 wherein said ratio of oil to homogenous dairy-based solution is 1:7.3.

9. The method of claim 1 wherein said oil composition is distributed at a level from 5 ml to 80 ml per square foot of said demonstration surface.

10. The method of claim 1 wherein said oil composition is selected from the group consisting of: sesame oil, canola oil, olive oil, grapeseed oil, coconut oil, corn oil, peanut oil, and mixtures thereof.

11. The method of claim 1 wherein said method further comprises the step of diluting said cleaning composition with an aqueous carrier and forming a suds dispersion, prior to said adding step.

12. The method of claim 11 wherein said suds dispersion comprises said cleaning composition to said aqueous carrier in a ratio of 1:60.

13. The method of claim 11 wherein said method step further comprises dispensing said cleaning composition onto a cellulose sponge and immersing said sponge into a container comprising an aqueous carrier and squeezing said sponge about 10 times to generate suds.

14. The method of claim 1 wherein said cleaning composition is a dish detergent.

15. The method of claim 1 wherein said cleaning composition comprises an anionic surfactant system.

16. A method of demonstrating the grease cleaning performance of a cleaning composition, said method comprising the steps of:
   (a) providing a homogenous dairy-based solution having a temperature of 5° C. to 50° C. on a demonstration surface;
   (b) distributing an oil composition on said surface, wherein the ratio of oil to homogenous dairy-based solution is 1:2.2 to less than 1:44;
   (c) waiting from about 1 minute to less than 15 minutes for said oil composition to disperse to form a visibly even oil dispersion on said demonstration surface;
   (d) adding a cleaning composition on said oil dispersion.

17. A method of demonstrating the grease cleaning performance of a dish detergent, said method comprising the steps of:
   (a) providing a homogenous dairy-based solution having a temperature of 25° C. to 30° C. on a demonstration surface;
   (b) distributing an oil composition on said surface, wherein the ratio of oil to homogenous dairy-based solution is 1:2.2 to less than 1:5;
   (c) waiting from about 1 minute to about 3 minutes for said oil composition to disperse to form a visibly even oil dispersion on said demonstration surface;
   (d) diluting a dish detergent with an aqueous carrier and forming a suds dispersion; and
   (e) adding said suds dispersion on said oil dispersion.

* * * * *